United States Patent [19]

Williams

[11] Patent Number: 5,568,984
[45] Date of Patent: Oct. 29, 1996

[54] FUEL LUBRICATED BEARING

[75] Inventor: Gregg G. Williams, Milford, Mich.

[73] Assignee: Williams International Corporation, Walled Lake, Mich.

[21] Appl. No.: 523,258

[22] Filed: Sep. 5, 1995

[51] Int. Cl.[6] .............. F16C 33/66; F02C 7/06; F01M 9/04
[52] U.S. Cl. .............. 384/475; 60/39.08; 184/6.11; 184/54; 384/462
[58] Field of Search .................. 384/462, 465, 384/473, 474, 475; 60/39.08, 736; 184/6.11, 54

[56] References Cited

U.S. PATENT DOCUMENTS

| | | | |
|---|---|---|---|
| 2,911,267 | 11/1959 | Small, Jr. ............................. | 60/39.08 |
| 3,243,243 | 3/1966 | Diver et al. ........................... | 384/465 |
| 3,531,167 | 9/1970 | Edge et al. ............................ | 384/475 |
| 4,080,783 | 3/1978 | Hamburg et al. ..................... | 60/39.08 |
| 4,205,525 | 6/1980 | Hamburg et al. ..................... | 60/39.08 |
| 5,183,342 | 2/1993 | Daiber et al. ....................... | 384/462 X |

*Primary Examiner*—Thomas R. Hannon
*Attorney, Agent, or Firm*—Lyon P.C.

[57] ABSTRACT

A fuel lubricated anti-friction bearing comprises an inner race for an anti-friction bearing having a plurality of radially opening apertures communicating with a fuel supply, a rotatable outer race, and a plurality of anti-friction rollers between the inner and outer races, rotation of the outer race effecting rotation of the rollers and pumping of fuel radially outwardly through the apertures in the inner race of the rollers.

6 Claims, 2 Drawing Sheets

FUEL LUBRICATED BEARING

BACKGROUND OF THE INVENTION

Gas turbine engines often utilize rotary fuel injectors or "slingers" to deliver fuel to the combustion chamber of the engine. Fuel flows axially through the main shaft of the engine and is thereafter injected radially into the combustion chamber thereof through nozzles that rotate with the shaft. The present invention takes advantage of the presence of pressurized fuel internally of the engine shaft and is based on the premise that conventional jet fuels are capable of providing satisfactory lubrication of anti-friction bearings. The use of fuel as a lubricant eliminates the requirement for an independent lubrication system comprising, for example, oil mist generators, oil pumps, oil sumps, and associated plumbing.

However, a significant disadvantage heretofore associated with the use of fuel as a lubricant has been the difficulty in producing a pressure differential across the bearing sufficient to induce flow of fuel therethrough. It is known to discharge pressurized fuel into the atmosphere to produce the desired pressure differential across the bearing but loss of fuel and pollution caused by the discharged fuel is unacceptable.

The present invention removes the aforesaid objection to the use of fuel as a lubricant by inducing flow of fuel through the bearing by an inherent centrifugal pumping action and thereafter recapturing the fuel.

SUMMARY OF THE INVENTION

In accordance with a preferred embodiment of the present invention, fuel is introduced under pressure to a fuel manifold contiguous with a fuel conduit internally of the shaft assembly of the gas turbine. A portion of the fuel is induced to flow radially through the rear bearing for the shaft, thence is returned to the fuel conduit for injection into the engine combustion chamber by a rotary fuel injection system.

Specifically, the outer race of the turbine engine rear roller bearing is installed in the hollow aft end of the turbine shaft. The inner race of the bearing is supported on a stationary fuel delivery nozzle. Apertures are provided in the inner race of the bearing to allow a portion of the fuel to flow radially under the rollers of the bearing due to both a centrifugal pumping action and a pressure differential across the bearing induced by fuel flow into a fuel conduit internally of the turbine shaft.

The fuel utilized for lubrication is prevented from leaking aft of the bearing cavity by a rotary seal carried by the turbine shaft. The seal extends radially inwardly into sealing relationship to the delivery nozzle assembly. The shaft seal is orientated so that the lip thereof is located at a radius, relative to the axis of rotation of the turbine shaft, substantially equal to that of the roller track on the inner race of the bearing. Thus, rotation of the turbine shaft causes fuel to be centrifuged radially away from the area of the seal lip thereby enhancing seal life and efficiency. After passing through the bearing, fuel is redirected forwardly around the outer race of the bearing into the fuel injection conduit internally of the turbine shaft.

DETAILED DESCRIPTION OF THE PREFERRED EMBODIMENT(S)

Figure 1:
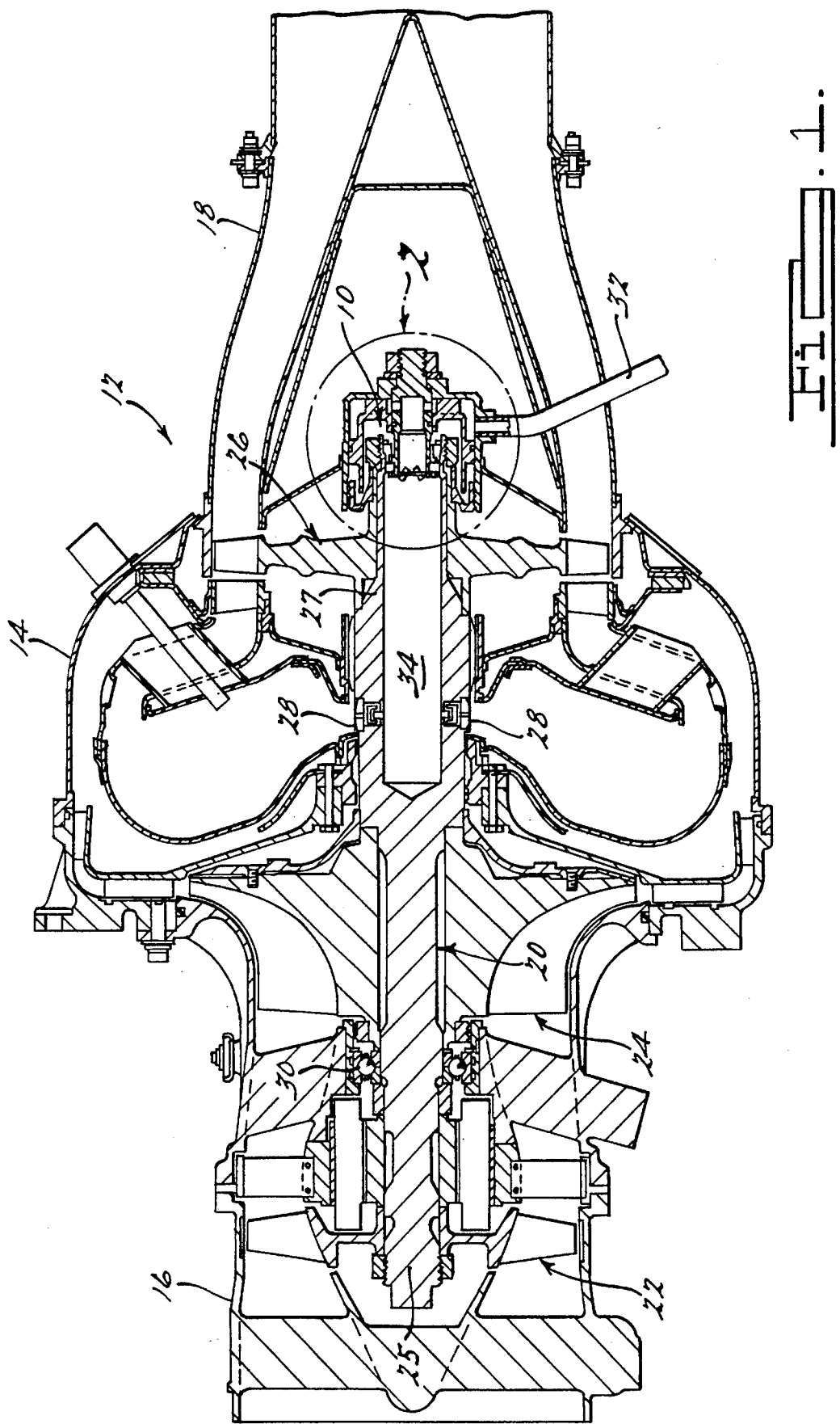
FIG. 1 is an elevational view of a gas turbine engine having a fuel lubricated rear bearing in accordance with the instant invention.

Referring to FIG. 1 of the drawings, a fuel lubricated bearing 10 in accordance with a preferred embodiment of the instant invention, is shown in the environment of a gas turbine engine 12.

The engine 12 comprises a combustion section 14, a forward air inlet section 16, and an aft discharge section 18. An engine shaft 20 extends aft from, the air inlet section 16, through the combustion section 14 to the discharge section 18. The shaft 20 supports a fan 22 and compressor 24 at a forward end 25 thereof, a turbine rotor 26 at an aft end 27 thereof, and a plurality of rotary fuel injectors 28 intermediate the compressor 24 and turbine rotor 26. The shaft 20 is supported for rotation by a conventional bearing 30 at the forward end 25 thereof and by the fuel lubricated bearing assembly 10 at the aft end 27 thereof.

Fuel is introduced to the aft end 27 of the engine shaft 20 from a supply tube 32 to a fuel manifold 33, thence flows forwardly to the fuel injectors 28 through a cylindrical fuel conduit 34, disposed centrally of the shaft 20.

Figure 2:
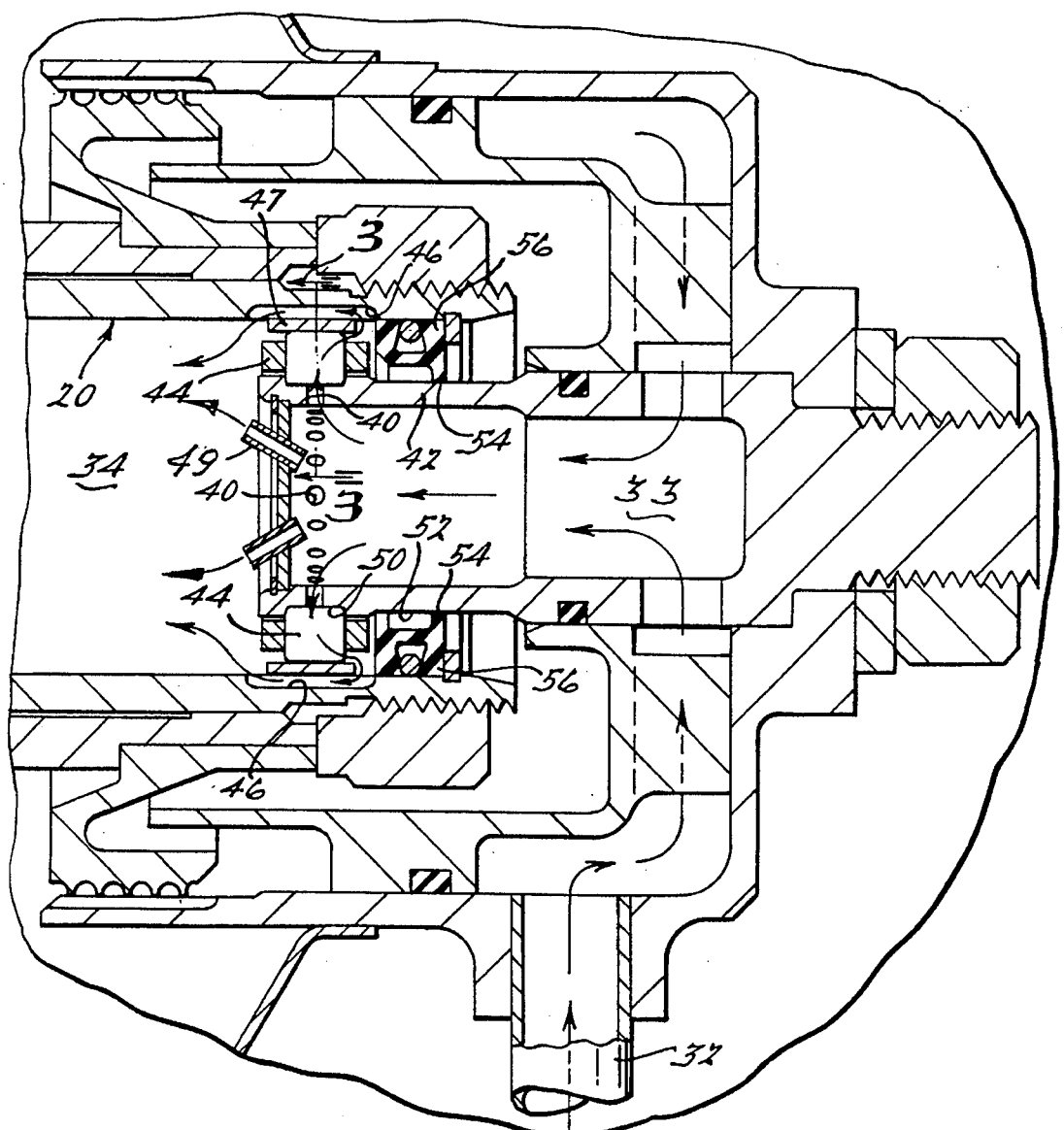
FIG. 2 is a view taken within the circle 2 of FIG. 1.
Figure 3:
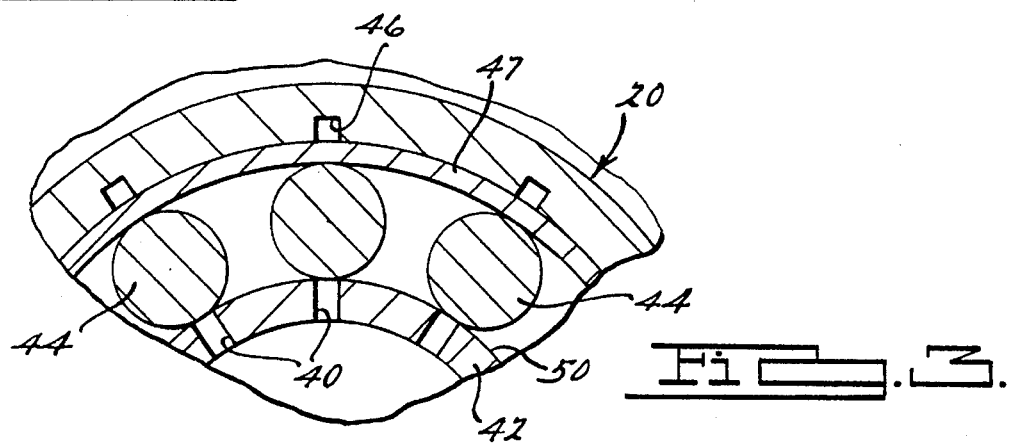
FIG. 3 is a view taken along the line 3—3 of FIG. 2.

As best seen in FIG. 2 of the drawing, fuel is induced to flow through radially directed apertures 40 in a combination inner race and bearing support 42 due to a centrifugal pumping action generated by rotation of the rollers 44 of the bearing 10. Any fuel flowing aft of the bearing 10 is redirected first radially outwardly thence axially forwardly through a plurality of passages 46 disposed radially outwardly of an outer race 47 carried by the shaft 20. Fuel then flows back into the conduit 34 for injection into the combustor 14 by the fuel slingers 28.

In accordance with one feature of the invention, fuel flow from the manifold 33 to the conduit 34 is restricted by angularly orientated nozzles 49 that function as a venturi to create a pressure differential across the bearing 10 to further induce fuel flow therethrough.

It is to be noted that, in accordance with one feature of the instant invention, a rolling surface 50 for the rollers 44 of the bearing 10 is axially aligned with a cylindrical surface 52 on the bearing support 42. A lip 54 of a rotary seal 56 carried by the aft end 27 of the turbine shaft 20 is sufficiently elastic to slide over axially spaced roller guide lands of the bearing 10 and extends into sealing relation with the stationary surface 52 on the support 42. The orientation and configuration of the seal 56 relative to the surface 52 of the bearing support 42 cooperates with the centrifugal pumping action of the rollers 44 to insure that no fuel flows aft of the bearing 10 for possible discharge to the atmosphere.

While the preferred embodiment of the invention has been disclosed, it should be appreciated that the invention is susceptible of modification without departing from the scope of the following claims.

I claim:

1. A fuel lubricated anti-friction bearing comprising:

a fuel inlet manifold;

a cylindrical inner race for an anti friction bearing supported by said manifold having a plurality of radially opening apertures communicating with said manifold in fluid flow relation;

a hollow engine shaft;

an outer race on said engine shaft; and a plurality of anti friction rollers between said inner and outer races, rotation of said engine shaft effecting rotation of said rollers and pumping of fuel radially outwardly of said fuel inlet manifold through the apertures in the inner race of said bearing to the rollers thereof.

2. A fuel lubricated anti-friction bearing comprising:

a fuel inlet manifold;

a cylindrical inner race for an anti friction bearing supported by said manifold having a plurality of radially opening apertures communicating with said manifold in fluid flow relation;

a hollow engine shaft defining a fuel injection conduit;

a plurality of fuel injectors on said engine shaft communicating with the fuel conduit therein;

an outer race on said engine shaft; and a plurality of anti friction rollers between said inner and outer races, rotation of said engine shaft effecting rotation of said rollers and pumping of fuel radially outwardly of said fuel inlet manifold through the apertures in the inner race of said bearing to said rollers.

3. The bearing of claim 2 comprising a plurality of axially extending passages disposed radially outwardly of the outer race on said engine shaft and communicating with the fuel injection conduit therein and with the opposite side of said rollers from said fuel injection conduit for conducting fuel flowing through the apertures in the inner race to the fuel conduit in said engine shaft.

4. The bearing of claim 2 comprising a plurality of orifices between said fuel inlet manifold and fuel conduit for creating a pressure differential therebetween.

5. The bearing of claim 4 wherein said orifices comprise a plurality of radially outwardly directed nozzles for developing a relatively low fuel pressure zone between said rollers and said fuel injection conduit to induce the flow of fuel through the apertures in said inner race to said fuel injection conduit.

6. The bearing of claim 2 comprising a seal on said engine shaft between an end thereof and said bearing, said seal having a seal lip axially aligned with the inner race on said bearing.

* * * * *